(12) United States Patent
Amaral et al.

(10) Patent No.: US 6,910,346 B2
(45) Date of Patent: Jun. 28, 2005

(54) HEAT PUMP TEMPERATURE CONTROL DEVICE FOR MOTOR VEHICLE

(75) Inventors: Manuel Amaral, Vitry-sur-Seine (FR); Thomas Gielda, Brighton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/276,814

(22) PCT Filed: May 14, 2001

(86) PCT No.: PCT/FR01/01456
§ 371 (c)(1), (2), (4) Date: Oct. 6, 2003

(87) PCT Pub. No.: WO01/87650
PCT Pub. Date: Nov. 22, 2001

(65) Prior Publication Data
US 2004/0050086 A1 Mar. 18, 2004

(51) Int. Cl.$^7$ ................................................ B60H 1/32
(52) U.S. Cl. .............................. 62/244; 62/434; 62/435
(58) Field of Search .......................... 62/244, 406, 434, 62/435, 507

(56) References Cited

U.S. PATENT DOCUMENTS

| | | | | |
|---|---|---|---|---|
| 3,139,924 A | * | 7/1964 | Schreiner ....................... | 62/160 |
| 4,531,379 A | * | 7/1985 | Diefenthaler, Jr. ........... | 62/236 |
| 4,756,279 A | | 7/1988 | Temmesfeld | |
| 5,020,320 A | * | 6/1991 | Talbert et al. .............. | 62/238.7 |
| 5,133,302 A | * | 7/1992 | Yamada et al. ........... | 123/41.12 |
| 5,205,484 A | * | 4/1993 | Susa et al. .................. | 236/35.3 |
| 5,421,169 A | * | 6/1995 | Benedict ....................... | 62/244 |
| 5,934,360 A | * | 8/1999 | Ban et al. ...................... | 165/43 |
| 5,966,952 A | * | 10/1999 | Misawa et al. ............... | 62/159 |
| 6,038,877 A | * | 3/2000 | Peiffer et al. ................. | 62/244 |
| 6,070,650 A | * | 6/2000 | Inoue et al. .................. | 165/42 |
| 6,126,079 A | * | 10/2000 | Shoemaker .................. | 236/35 |
| 6,205,811 B1 | * | 3/2001 | d'Alencon ................... | 62/498 |
| 6,276,161 B1 | * | 8/2001 | Peiffer et al. ................. | 62/406 |
| 6,345,216 B1 | * | 2/2002 | Morimoto et al. ............ | 701/22 |

FOREIGN PATENT DOCUMENTS

| | | | |
|---|---|---|---|
| FR | 2 697 210 | | 4/1994 |
| JP | 354107030 A | * | 8/1979 |
| JP | 360252017 A | * | 12/1985 |

* cited by examiner

Primary Examiner—William Doerrler
Assistant Examiner—Mohammad M. Ali
(74) Attorney, Agent, or Firm—Brinks Hofer Gilson & Lione

(57) ABSTRACT

The device includes a heat pump integrating a refrigerant circuit taking calories from a cold source to transfer them towards a warm source. The device also includes a heat-conducting fluid/air thermal exchanger called external exchanger (30), located in the vehicle engine compartment (34), the heat-conducting fluid being either the refrigerant or a heat-conducting fluid in thermal exchange with the cold source refrigerant. The device also includes means of formation of an air flow, preferably a fan (40), circulating through the external exchanger (30) and called outlet air flow, directed from inside the engine compartment (34) to outside the vehicle. Preferably, the fan (40) shall be able to rotate in a first direction to form an air flow directed from outside the vehicle to inside the engine compartment (34) and called inlet air flow, and in a reverse direction to form the outlet air flow.

18 Claims, 3 Drawing Sheets

HEAT PUMP TEMPERATURE CONTROL DEVICE FOR MOTOR VEHICLE

This invention relates to a heat pump based thermal regulation device for automotive vehicles.

It is already known in the state of the art, especially according to FR-2 697 210, a process of thermal regulation for automotive vehicles of the type including:

a heat pump including a compression refrigerant circuit taking calories from a cold source to transfer them at least partially towards a warm source, and a heat-conducting fluid/air thermal exchanger, called external exchanger, located in the vehicle engine compartment, the heat-conducting fluid being either the refrigerant or a heat-conducting fluid in thermal exchange with the cold source refrigerant.

The compression circuit generally includes an evaporator, in thermal exchange with the cold source, and a condenser, in thermal exchange with the warm source, these elements being connected to each other by a compressor and a regulator. The refrigerant vaporises in the evaporator by taking the heat from the cold source. The compressor pumps the vaporised refrigerant in and pumps it out in the cooled condenser (by thermal exchange with the warm source) in which it condenses. The regulator lets the liquid refrigerant flow towards the evaporator by decreasing its pressure.

A heat pump can be used either to heat a space or a component or to cool this space or component.

In FR-2 697 210, on the one hand, the cold source includes a first refrigerant/heat-conducting fluid thermal exchanger thermally coupling the refrigerant circuit, forming a main circuit, to a first secondary heat-conducting fluid circuit and, on the other hand, the warm source includes a second refrigerant/heat-conducting fluid thermal exchanger thermally coupling the main refrigerant circuit to a second secondary heat-conducting fluid circuit.

The secondary circuits can be connected selectively, by appropriate valves, to an external thermal exchanger, located preferably at the front of the vehicle engine compartment, and to an internal thermal exchanger, preferably located in the vehicle passenger compartment. By operating these valves, the heat pump can be used either to cool the vehicle passenger compartment (in that first case, the warm source is the external thermal exchanger and the cold source is the internal thermal exchanger) or to heat the passenger compartment (in that second case, the warm source is the internal thermal exchanger and the cold source is the external thermal exchanger).

It shall be noted in the latter case that the heat pump performances are limited by the outside air temperature. Indeed, in winter, the air temperature limits the heat pump output, when it is used to heat the passenger compartment. On the other hand, the freezing of the cold source in winter can impair the operating performances of the heat pump.

The aim of this invention is to optimise the performances of a heat pump based thermal regulation device especially when it is used to heat an automotive vehicle passenger compartment.

To this end, the object of this invention is a thermal regulation device for automotive vehicles, of the above mentioned type, characterised in that it includes means of formation of an air flow circulating through the external exchanger, called outlet air flow, directed from inside the engine compartment to outside the vehicle.

According to the characteristics of several device implementation modes:

the air flow formation means include a fan;

the fan shall be able to rotate in a first direction to form an air flow directed from outside the vehicle to inside the engine compartment, called inlet air flow, and in a reverse direction to form the outlet air flow;

the inlet air flow is aimed at circulating through a heat-conducting fluid/air thermal exchanger, connected to the engine cooling system, when this heat-conducting fluid/air thermal exchanger is activated;

the fan is longitudinally inserted between the external exchanger and a sealable front air inlet establishing communication between the engine compartment and outside the vehicle;

the fan is longitudinally inserted between the engine and the external exchanger;

the device includes means of return of the outlet air flow downstream the external exchanger, aimed at directing the outlet air flow towards an air outlet submitted to a dynamic air pressure lower than the pressure to which the front air inlet is submitted;

the outlet air flow return means include front air inlet sealing means.

the air outlet is located in a wall forming the bottom of the engine compartment;

The external exchanger is a cold source refrigerant/air exchanger;

The cold source includes a refrigerant/heat-conducting fluid exchanger thermally coupling the refrigerant circuit to a heat-conducting circuit connected to the external exchanger.

The invention will be better understood by reading the following description, only given for example and made by referring to the drawings:

FIG. 4 is a side schematic view of the thermal regulation device according to the third invention implementation mode.

FIG. 1 represents a heat pump assembly, referred to as reference 10, for a thermal regulation device according to the invention and represented in several implementation modes in FIGS. 2 to 5.

Figure 1:
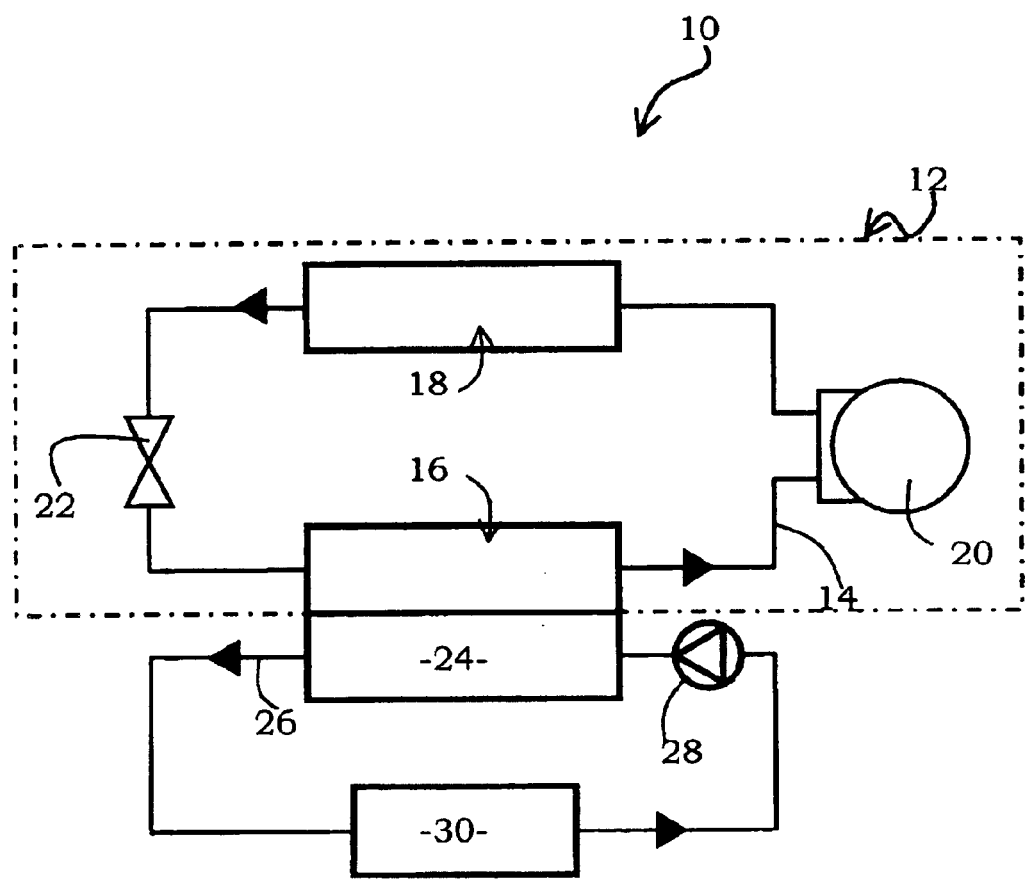
FIG. 1 is a schematic view representing a heat pump assembly for a thermal regulation device according to the invention.

In the following description, two components are called thermally coupled when they exchange heat between each other via an appropriate thermal exchanger.

The thermal regulation device 10 includes a heat pump 12 integrating a compression type main refrigerant circuit 14, taking calories from a cold source 16 to transfer them at least partially to a warm source 18.

In the described example, cold and warm sources 16 and 18 are connected to each other by a compressor 20 (electrical and/or mechanical) and a pressure relief valve 22. The refrigerant vaporises by taking the heat from the cold source 16. The compressor 20 pumps the vaporised refrigerant in and pumps it out towards a warm source where it condenses when cooling. The pressure relief valve 22 lets the liquid refrigerant flow towards the cold source 16 by decreasing its pressure. The refrigerant circulation in the circuit 14 is indicated by arrows in FIG. 1.

The cold source 16 includes a refrigerant/heat-conducting fluid thermal exchanger 24, called cold source exchanger, thermally coupling the main refrigerant circuit 14 to a heat-conducting fluid secondary circuit 26.

This secondary circuit includes a pump 28 for the heat-conducting fluid circulation, connected to the inlet of the cold source exchanger 24. The heat-conducting fluid circulation in the secondary circuit 26 is indicated by an arrow in FIG. 1.

The refrigerant circulating in the main circuit 14 is a traditional one. This refrigerant can be for example either a chlorinated or fluorinated derivative of methane or ethane (Freon), or an hydrocarbon, or ammonia or carbon dioxide. The heat-conducting fluid circulating in the secondary circuit 26 is preferably a water/antifreeze mixture (glycol).

In the example illustrated, the secondary circuit 26 is aimed at being connected, in at least some usage configurations, to a thermal exchanger called external exchanger 30, as represented in FIG. 1. The external exchanger 30 is a heat-conducting fluid/air exchanger.

If applicable, the warm source 18 can include a refrigerant/heat-conducting fluid thermal exchanger (not represented) thermally coupling the refrigerant main circuit 14 to a heat-conducting fluid secondary circuit (not represented).

The heat pump 12 is aimed at being used, depending on the selected operating mode, either to cool or to heat the vehicle passenger compartment. When the heat pump is used to heat the passenger compartment, the warm source 18 brings calories to the passenger compartment.

Figure 2:
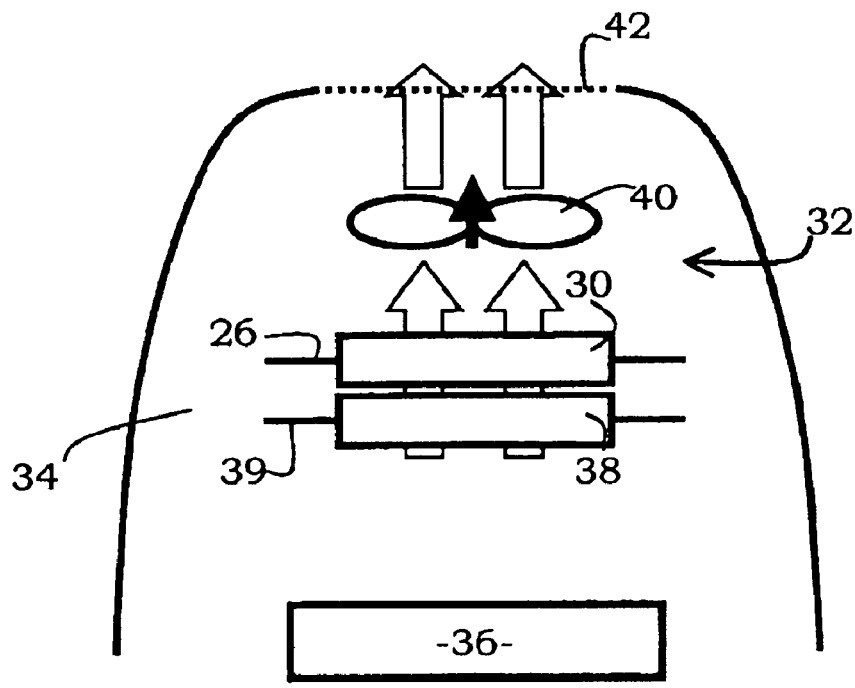
FIG. 2 is a top schematic view of a vehicle front part equipped with a thermal regulation device according to a first invention implementation mode.

FIG. 2 represents the front end of an automotive vehicle equipped with a thermal regulation device according to the first invention implementation mode, referred to as the general reference 32.

The vehicle front end delimits a compartment 34 for the vehicle thermal engine 36. The external exchanger 30 is located in the vehicle engine compartment 36.

FIG. 1 also represents a heat-conducting fluid/air thermal exchanger 38, of traditional type, called cooling exchanger, connected to the engine 36 cooling system 39. For example, the external exchanger 30 and cooling exchanger 38 are located one behind the other when considering the vehicle in its longitudinal direction.

A fan 40, driven by classical motorised means, is longitudinally inserted between the external exchanger 30 and a sealable front air inlet 42 establishing communication between the engine compartment and outside the vehicle.

The fan 40 is controlled by traditional means making it rotate, on the one hand, in a first direction, to form an air flow directed from outside the vehicle to inside the engine compartment 34 (in the reverse direction to that of the thick arrows represented in FIG. 2), called inlet air flow and, on the other hand, in a second reverse direction to form an air flow directed from inside the engine compartment 34 to outside the vehicle (in the direction of the thick arrows represented in FIG. 2), called outlet air flow.

Therefore the fan 40 operates selectively in blowing mode (rotation in the first direction) or aspirating mode (rotation in the second direction).

As long as the engine temperature is under a defined threshold (for example for a more or less long period after starting), the cooling system 39, and more specifically, the cooling exchanger 38 are deactivated (the engine cooling mean activation is generally controlled by a thermostat). The fan 40 is controlled in order to rotate in the outlet air flow formation second direction. The vehicle passenger compartment can be then heated by the heat pump 12 operating in heating mode in which the warm source 18 brings calories to the passenger compartment.

When the cooling exchanger 38 is activated, the fan 40 is controlled preferably in order to rotate in the inlet air flow formation first direction. This inlet air flow circulates through the cooling exchanger 38 by favouring thermal exchanges between the cold air flow coming from outside the vehicle and the heat-conducting fluid circulating in the cooling circuit 39. In this fan 40 operating mode, the front air inlet 42 is at least partially open.

On the other hand, when the external exchanger 30 is activated and the thermal exchanger 38 is deactivated, the fan 40 is controlled preferably in order to rotate in the outlet air flow formation second direction. This outlet air flow circulates through the external exchanger 30 by favouring thermal exchanges between the air flow coming from inside the passenger compartment 34 and the heat-conducting fluid circulating in the secondary circuit 26.

Various exothermal components are generally located in the compartment 34, especially the thermal engine. Therefore, the outlet air flow, coming from inside the passenger compartment 34, is generally warmer than the inlet air flow. The cold source 16, thermally coupled to the external exchanger 30, is warmer when the external exchanger 30 is in contact with the outlet air flow (relatively warm) than when it is in contact with the air coming from outside the vehicle.

The fan 40 activation in order to generate the outlet air flow optimises the heat pump 12 operation and to reduce the risk of freezing of the external exchanger 30, especially in winter, when the heat pump 12 is used in passenger compartment heating mode.

It shall be noted that, in the first invention implementation mode illustrated in FIG. 2, the outlet air flow is drained of the engine compartment 34 via the front air inlet 42 which is at least partially open.

Figure 3:
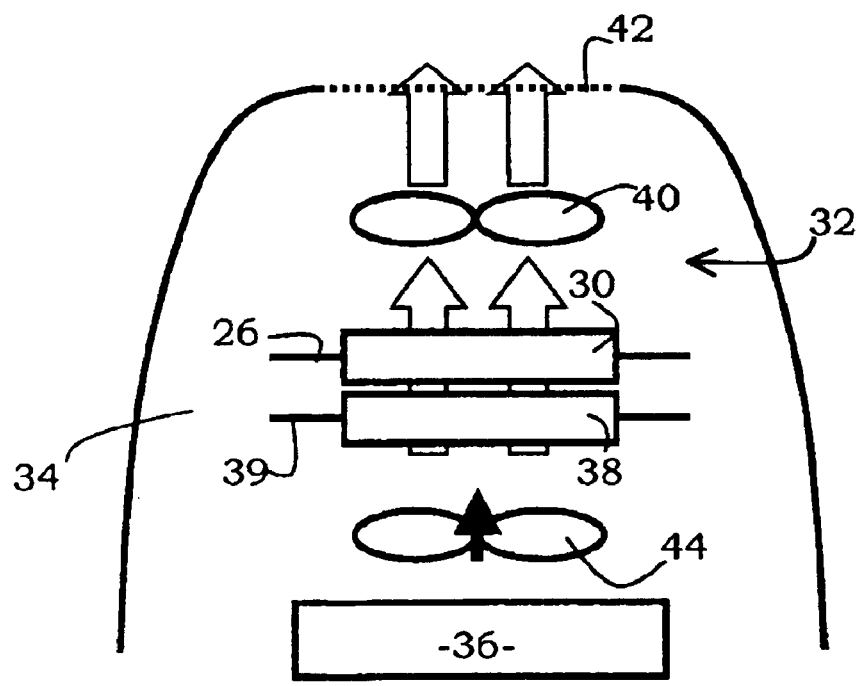
FIGS. 3 and 4 are views similar to FIG. 2 representing thermal regulation devices according to a second and a third invention implementation modes respectively.
Figure 4:
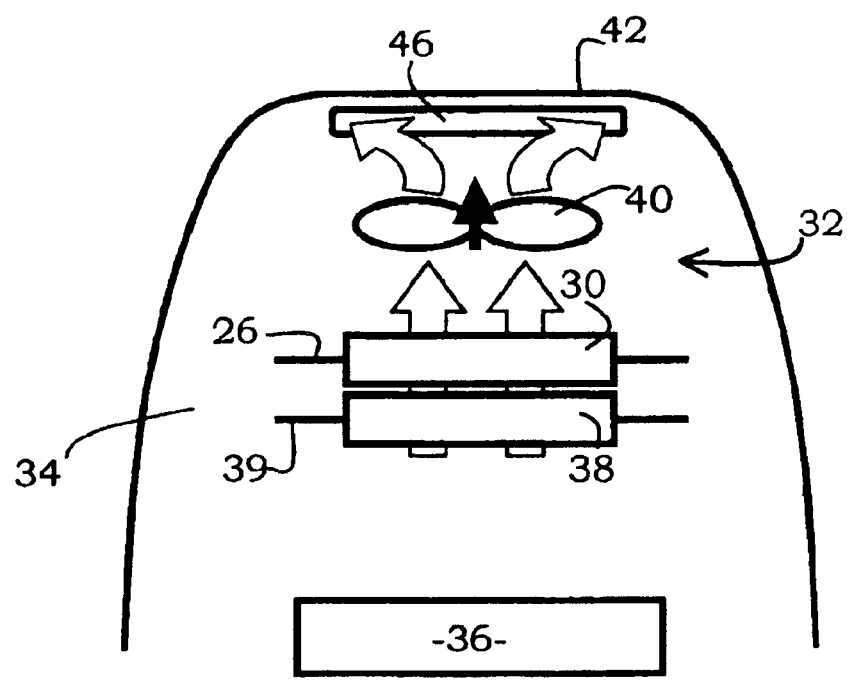
Figure 5:
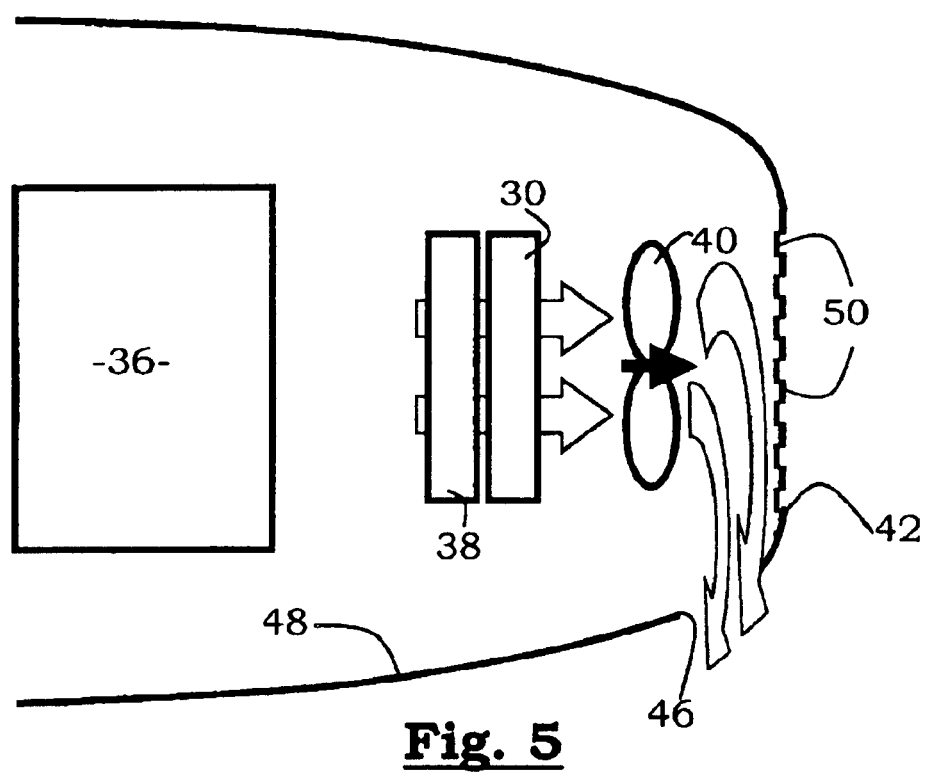

In FIGS. 3 to 5, thermal regulation devices are represented according to the second and third implementation modes. In these figures, the elements similar to those of the previous figures are designated by the same references.

In the second implementation mode, illustrated in FIG. 3, an additional fan 44 is longitudinally inserted between the engine 36 and the external exchanger 30.

In that case, the fan 40 is aimed at forming the inlet air flow and the additional fan 44 is aimed at forming the outlet air flow. This optimises fan 40 and 44 operation, especially in terms of flow and noise level, by taking into account the fact that their respective aims: to form the inlet air flow for the first fan 40 and the outlet air flow for the second fan 44.

When the additional fan 44 is activated to generate the outlet air flow (heat pump 12 operating in heating mode), the fan 40 is generally deactivated (cold engine). When the fan 40 is activated to generate the inlet air flow (cooling exchanger 38 activated), the additional fan 44 is generally deactivated (heat pump 12 deactivated).

In the third implementation mode, illustrated in FIGS. 4 and 5, the outlet air flow is sent back, downstream the external exchanger 30, to an air outlet 46 submitted to a dynamic air pressure lower than the pressure to which the front inlet 42 is submitted. Preferably, the air outlet 46 is located in an approximately horizontal wall 48 forming the bottom of the engine compartment 34.

Front inlet 42 sealing means 50, such as traditional controlled valves, allow, by at least partially sealing the inlet 42, to send the outlet air flow back downstream the external exchanger in an approximately vertical direction easing the air discharge by the outlet 46.

The invention is not limited to the implementation modes described hereabove.

In particular, the fan 40 in the first and third implementation modes is not necessarily shared by the external exchanger 30 and the cooling exchanger 38. A fan specific to the external exchanger 30 can be added.

On the other hand, in the case of a traditional two-way cycle heat pump (refrigerant two-way circulation), the heat-conducting fluid/air exchanger 30 and the secondary circuit 26 can be removed. A refrigerant/air exchanger located in place of the heat-conducting fluid/air exchanger 30 and having the same function will be used as a cold source exchanger 24.

Lastly, the engine 36 aiming at powering the vehicle is not necessarily a thermal engine and can be of another type, for example of electric type.

What is claimed is:

1. A thermal regulation device for automotive vehicles, comprising:
    a heat pump including a compression refrigerant circuit taking calories from a cold source to transfer them at least partially towards a warm source;
    an external exchanger located in the vehicle engine compartment and in thermal exchange with the cold source; and
    a means of formation of an air flow circulating through the external exchanger, the air flow including an outlet air flow directed from inside the engine compartment to outside the vehicle in an outlet direction while an engine compartment temperature is below a threshold value and an inlet air flow directed front outside the vehicle to inside the engine compartment in an inlet direction while the engine compartment temperature is above the threshold value.

2. A device according to claim 1, characterized in that air flow formation means includes a fan.

3. A device according to claim 2, characterized in that the fan rotates in a first direction to form the inlet air flow and in a reverse direction to form the outlet air flow.

4. A device according to claim 3, characterized in that the inlet air flow circulate through a the external exchanger when the engine compartment temperature is above the threshold value.

5. A device according to claim 4, characterized in that the fan is longitudinally inserted between the external exchanger and a sealable front air inlet establishing communication between the engine compartment and outside the vehicle.

6. A device according to claim 4, characterized in that the fan is longitudinally inserted between the engine and the external exchanger.

7. A device according to claim 6, further comprising a means of return of the outlet air flow downstream the external exchanger, dedicated to direct the outlet air flow towards an air outlet submitted to a dynamic air pressure lower than the pressure to which the front inlet is submitted.

8. A device according to claim 7, characterized in that the outlet air flow return means includes a front air inlet sealing means.

9. A device according to claim 8, characterized in that the air outlet is located in a wall forming the bottom of the engine compartment.

10. A device according to claim 9, characterized in that the external exchanger is a rifrigerant/air cold source exchanger.

11. A device according to any claim 9, characterized in that the cold source includes a refrigerant/heat-conducting fluid exchanger thermally coupling the refrigerant circuit to a heat-conducting fluid circuit connected to the external exchanger.

12. A device according to claim 1, wherein the external exchanger is in fluid communication with an engine cooling system.

13. A device according to claim 12, wherein the external exchanger is in thermal exchange with the engine cooling system white the engine compartment temperature is above the threshold value.

14. A thermal regulation device for automotive vehicles, comprising
    a heat pump including a compression refrigerant circuit taking calories cold source to transfer them at least partially towards a warm source;
    an external exchanger located in the vehicle engine compartment and in thermal exchange with the cold source;
    a means of formation of an air flow circulating through the external exchanger, the air flow including an outlet air flow directed from inside the engine compartment to outside the vehicle in an outlet direction while an engine compartment temperature is below a threshold value and an inlet air flow directed from outside the vehicle to inside the engine compartment in an inlet direction while the engine compartment temperature is above the threshold value; and
    a means of return of the outlet air flow downstream the external exchanger to direct the outlet air flow towards an air outlet submitted to a dynamic air pressure lower than the pressure to which the front inlet is submitted.

15. A device according to claim 14, characterized in that the outlet air flow return means includes a front air inlet sealing means.

16. A device according to claim 15, characterized in that the air outlet is located in a wall forming the bottom of the engine compartment.

17. A device according to claim 16, characterized in that the external exchanger is a refrigerant/air cold source exchanger.

18. A device according to claim 17, characterized in that the cold source includes a refrigerant/heat-conducting fluid exchanger thermally coupling the refrigerant circuit to a heat-conducting fluid circuit connected to the external exchanger.

* * * * *

UNITED STATES PATENT AND TRADEMARK OFFICE
CERTIFICATE OF CORRECTION

| | |
|---|---|
| PATENT NO. | : 6,910,346 B2 |
| APPLICATION NO. | : 10/276814 |
| DATED | : June 28, 2005 |
| INVENTOR(S) | : Manuel Amaral et al. |

It is certified that error appears in the above-identified patent and that said Letters Patent is hereby corrected as shown below:

<u>Column 5,</u>
Line 2, after "flow circulate through" delete "a".

<u>Column 6,</u>
Line 3, before "the engine compartment" delete "white" and substitute -- while --.

Signed and Sealed this

Twenty-seventh Day of June, 2006

JON W. DUDAS
*Director of the United States Patent and Trademark Office*